(12) United States Patent
Seong et al.

(10) Patent No.: US 11,314,918 B1
(45) Date of Patent: Apr. 26, 2022

(54) METHOD AND APPARATUS FOR PATH ROUTING

(71) Applicant: SAMSUNG SDS CO., LTD., Seoul (KR)

(72) Inventors: Rak Kyeong Seong, Seoul (KR); Jae Ho Yang, Seoul (KR); Sang Hoon Han, Seoul (KR); Joung Oh Yun, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 17/080,161

(22) Filed: Oct. 26, 2020

(30) Foreign Application Priority Data

Oct. 16, 2020 (KR) .................. 10-2020-0134196

(51) Int. Cl.
```
G06F 30/347    (2020.01)
G06F 119/22    (2020.01)
G06F 30/394    (2020.01)
G06F 111/10    (2020.01)
G06F 113/18    (2020.01)
G06F 115/10    (2020.01)
```

(52) U.S. Cl.
CPC .......... *G06F 30/394* (2020.01); *G06F 30/347* (2020.01); *G06F 2111/10* (2020.01); *G06F 2113/18* (2020.01); *G06F 2115/10* (2020.01); *G06F 2119/22* (2020.01)

(58) Field of Classification Search
USPC ........................................................ 716/129
See application file for complete search history.

(56) References Cited

U.S. PATENT DOCUMENTS

| 7,363,126 B1 * | 4/2008 | Zhong ............. G01C 21/3484 340/992 |
| 2007/0256045 A1 * | 11/2007 | Lin .................. G06F 30/394 716/129 |

OTHER PUBLICATIONS

European Search Report For EP21156816.7 dated Aug. 10, 2021 from European patent office in a counterpart European patent application.

D. Staepelaere et al "Surf: A Rubber-Band Routing System for Multichip Modules" IEEE Design & Test of Computers, vol. 10, No. 4, Dec. 1, 1993 (Dec. 1, 1993), pp. 18-26, XP011418534, DOI: 10.1109/54.245960.

(Continued)

*Primary Examiner* — Bryce M Aisaka
(74) *Attorney, Agent, or Firm* — The PL Law Group, PLLC

(57) ABSTRACT

A method for path routing according to an embodiment of the present disclosure may include selecting a first start point and a first end point with which path routing is performed in a circular frame generated by connecting all points included in one or more start point sets included in a layer, one or more end point sets paired with the start point set, and one or more edge point pair sets to one closed curve, generating a connectivity graph by connecting edge points included in one or more nodes corresponding to segments obtained by dividing the circular frame into one or more regions, and connecting the first start point and the first end point based on a cost for connecting the first start point and the first end point calculated using the connectivity graph.

16 Claims, 11 Drawing Sheets

(56) References Cited

OTHER PUBLICATIONS

Shenghua Liu et al "Substrate Topological Routing for High-Density Packages" IEEE Transactions on Computer Aided Design of Integrated Circuits and Systems, vol. 28, No. 2, Feb. 1, 2009 (Feb. 1, 2009), pp. 207-216, XP011241596,DOI: 10.1109/TCAD.2008.2009154.
W-M Dai W et al "Rubber Band Routing and Dynamic Data Representation" Proceedings of the IEEE International Conference on Computer Aided Design,Nov. 11, 1990 (Nov. 11, 1990), pp. 52-55, XP032360371,DOI: 10.1109/ICCAD.1990.129838.

\* cited by examiner

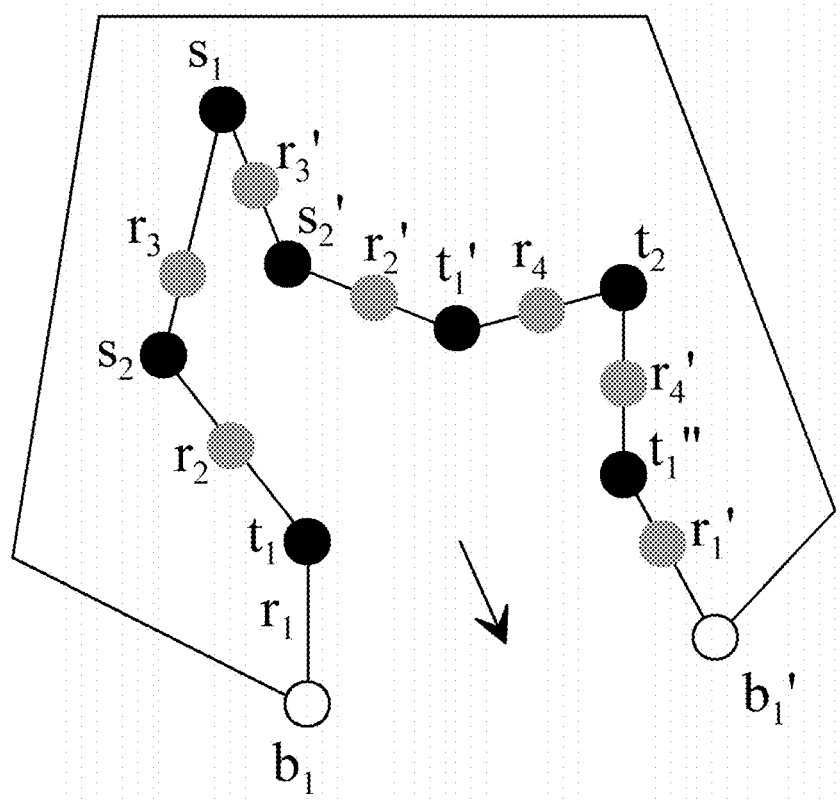

METHOD AND APPARATUS FOR PATH ROUTING

CROSS REFERENCE TO RELATED APPLICATIONS AND CLAIM OF PRIORITY

This application claims the benefit of Korean Patent Application No. 10-2020-0134196 filed on Oct. 16, 2020 in the Korean Intellectual Property Office, the disclosure of which is incorporated herein by reference in its entirety.

TECHNICAL FIELD

The disclosed embodiments relate to path routing technology.

BACKGROUND ART OF THE INVENTION

Various algorithms have been proposed to calculate an optimal path between two given points, such as Dijkstra algorithm. However, in the case of calculating an optimal path for a multilayer structure composed of a plurality of layers using such a conventional algorithm, as the number of layers, path start points, and path end points increases, an operation for finding the optimal path becomes more complex and the time for deriving the optimal path increases. Accordingly, there is a need for a method capable of efficiently calculating an optimal path even for a complex multilayer structure.

SUMMARY

The disclosed embodiments are intended to provide a method and apparatus for path routing.

According to an embodiment, a method, which is performed on a computing device comprising one or more processors and a memory storing one or more programs executed by the one or more processors, comprises selecting a first start point and a first end point with which path routing is performed in a circular frame generated by connecting all points included in one or more start point sets included in a layer, one or more end point sets paired with the start point set, and one or more edge point pair sets to one closed curve, generating a connectivity graph by connecting edge points included in one or more nodes corresponding to segments obtained by dividing the circular frame into one or more regions, and connecting the first start point and the first end point based on a cost for connecting the first start point and the first end point calculated using the connectivity graph.

The selecting of the first start point and the first end point may select one start point set from among the one or more start point sets and one end point set paired with the one start point set from among the one or more end point sets, and select the first start point and the first end point from the one selected start point set and the one selected end point set.

The selecting of the first start point and the first end point may select one start point set and one end point set from one or more start point sets and one or more end point sets excluding other previously selected start point sets and other previously selected end point sets.

The first start point and the first end point may be connected so as not to intersect a connection line connecting other start points and other end points previously connected.

The generating of the connectivity graph may generate one or more nodes corresponding to one or more segments, and connect the one or more nodes to each other by using an edge point connection line that connects one or more edge points included in each of the one or more nodes to each other, and wherein the edge point connection line may be generated by connecting edge points included in edge point pairs.

The cost may be calculated based on the number of edge point connection lines used to go from a node in which the first start point is included to a node in which the first end point is included.

When the node in which the first start point is included and the node in which the first end point is included are the same, the first start point and the first end point may be connected within the node without use of the edge point connection line.

The method may further comprise generating a segment by subdividing the circular frame based on a connection line connecting the first start point and the first end point.

According to an embodiment, a computing device comprises one or more processors and a memory storing one or more programs executed by the one or more processors, wherein the one or more programs include instructions for executing steps of: selecting a first start point and a first end point with which path routing is performed in a circular frame generated by connecting all points included in one or more start point sets included in a layer, one or more end point sets paired with the start point set, and one or more edge point pair sets to one closed curve, generating a connectivity graph by connecting edge points included in one or more nodes corresponding to segments obtained by dividing the circular frame into one or more regions, and connecting the first start point and the first end point based on a cost for connecting the first start point and the first end point calculated using the connectivity graph.

The selecting of the first start point and the first end point may select one start point set from among the one or more start point sets and one end point set paired with the one start point set from among the one or more end point sets, and select the first start point and the first end point from the one selected start point set and the one selected end point set.

The selecting of the first start point and the first end point may select one start point set and one end point set from one or more start point sets and one or more end point sets excluding other previously selected start point sets and other previously selected end point sets.

The first start point and the first end point may be connected so as not to intersect a connection line connecting other start points and other end points previously connected.

The generating of the connectivity graph may generate one or more nodes corresponding to one or more segments, and connect the one or more nodes to each other by using an edge point connection line that connects one or more edge points included in each of the one or more nodes to each other, and wherein the edge point connection line may be generated by connecting edge points included in edge point pairs.

The cost may be calculated based on the number of edge point connection lines used to go from a node in which the first start point is included to a node in which the first end point is included.

When the node in which the first start point is included and the node in which the first end point is included are the same, the first start point and the first end point may be connected within the node without use of the edge point connection line.

The program may further include generating a segment by subdividing the circular frame based on the connection line connecting the first start point and the first end point.

According to the disclosed embodiments, by connecting points on a substrate transformed into a circular frame using a connectivity graph, an efficient path calculation is possible even if the number of start points and end points increases.

BRIEF DESCRIPTION OF THE DRAWINGS

FIGS. 3A to 3D are exemplary diagrams for describing a method for generating the circular frame according to an embodiment

DETAILED DESCRIPTION

Hereinafter, a specific embodiment of the present invention will be described with reference to the drawings. The following detailed description is provided to aid in a comprehensive understanding of the methods, apparatus and/or systems described herein. However, this is only an example and the present invention is not limited thereto.

In describing the embodiments of the present invention, when it is determined that a detailed description of known technologies related to the present invention may unnecessarily obscure the subject matter of the present invention, a detailed description thereof will be omitted. In addition, terms to be described later are terms defined in consideration of functions in the present invention, which may vary according to the intention or custom of users or operators. Therefore, the definition should be made based on the contents throughout this specification. The terms used in the detailed description are only for describing embodiments of the present invention, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, parts or combinations thereof, other than those described.

Figure 1:
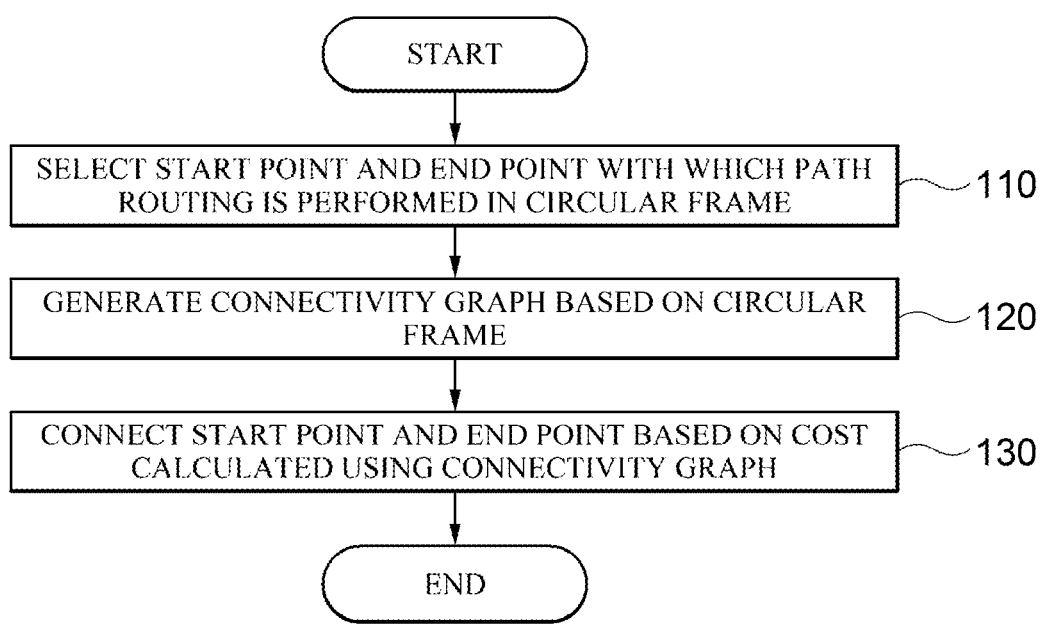
FIG. 1 is a flowchart of a method for path routing according to an embodiment.

FIG. 1 is a flowchart of a method for path routing according to an embodiment.

According to an embodiment, the apparatus for path routing may be a computing device including one or more processors and a memory that stores one or more programs executed by the one or more processors.

According to an embodiment, the apparatus for path routing may select a first start point and a first end point with which path routing is performed in a circular frame generated by connecting all points included in one or more start point sets included in a layer, one or more end point sets paired with the start point set, and one or more edge point pair sets to one closed curve (110).

Figure 2:
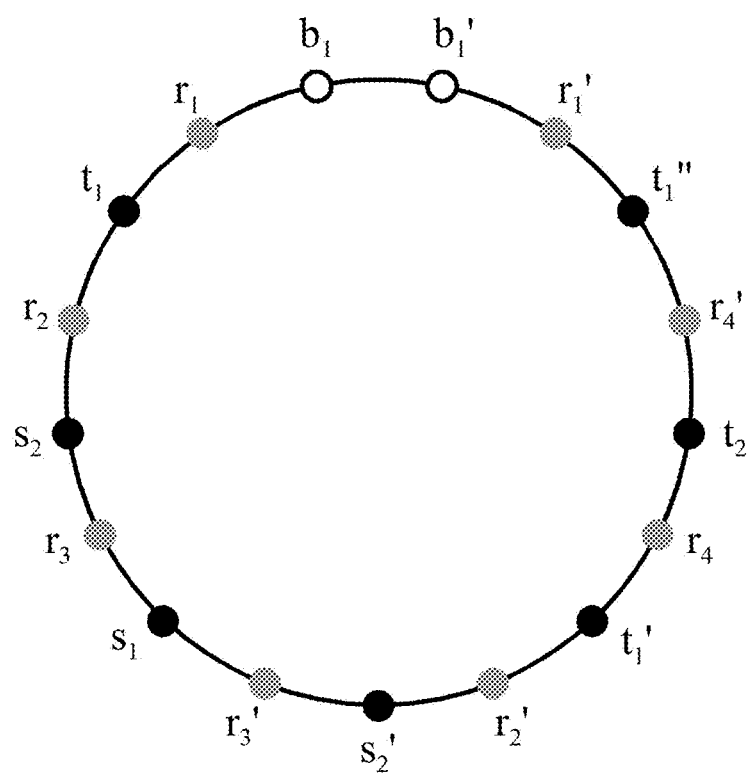
FIG. 2 is an exemplary view of a circular frame according to an embodiment.

FIG. 2 is an exemplary diagram of the circular frame according to an embodiment.

Referring to FIG. 2, as an example, the start point set may be $\{s_1\}$ for a start point S1 and $\{s_2, s_2'\}$ for a start point S2. As an example, the end point set may be $\{t_1, t_1', t_1''\}$ for an end point T1 and $\{t_2\}$ for an end point T2. As an example, the edge point pair set may be $\{(r_1, r_1'), (r_2, r_2'), (r_3, r_3'), (r_4, ,4')\}$.

According to an example, a circular frame may be connected by one closed curve including all of one or more start points, one or more end points, and one or more edge points.

According to an example, the start point set for S1 corresponds to the end point set for T1, and the start point set for S2 may correspond to the end point set for T2.

According to an example, the apparatus for path routing may select one start point and one end point for performing path routing.

According to an embodiment, the apparatus for path routing may select one start point set from among one or more start point sets and one end point set paired with one start point set from one or more end point sets.

According to an example, the apparatus for path routing may select the start point set for S1, which is one or more start point sets, and the start point set for S2, which is one or more start point sets. Thereafter, the apparatus for path routing may select the end point set for T1 corresponding to the start point set for S1.

According to an embodiment, the apparatus for path routing may select a first start point and a first end point from one selected start point set and one selected end point set.

According to an example, the apparatus for path routing may select S1, which is one of one or more start points included in the start point set for S1 selected above, as the first start point. In addition, the apparatus for path routing may select $t_1''$, which is one of one or more end points included in the end point set for T1 selected above, as the first end point.

According to an embodiment, the apparatus for path routing may select one start point set and one end point set from among one or more start point sets and one or more end point sets excluding other previously selected start point sets and other previously selected end point sets.

According to an example, if the start point set for S1 and the end point set for T1 have already been selected, the apparatus for path routing may select one start point and one end point from among one or more start point sets and one or more end point sets excluding the start point set for S1 and the end point set for T1.

As an example, if the start point set for S1 and the end point set for T1 have already been selected, the apparatus for path routing may select a start point set for S2 and an end point set for T2 excluding the start point set for S1 and the end point set for T1.

Thereafter, the apparatus for path routing may perform path routing by selecting a start point and an end point included in the start point set for S2 and the end point set for T2.

FIGS. 3A to 3D are exemplary diagrams for describing a method for generating a circular frame according to an embodiment.

Figure 3A:
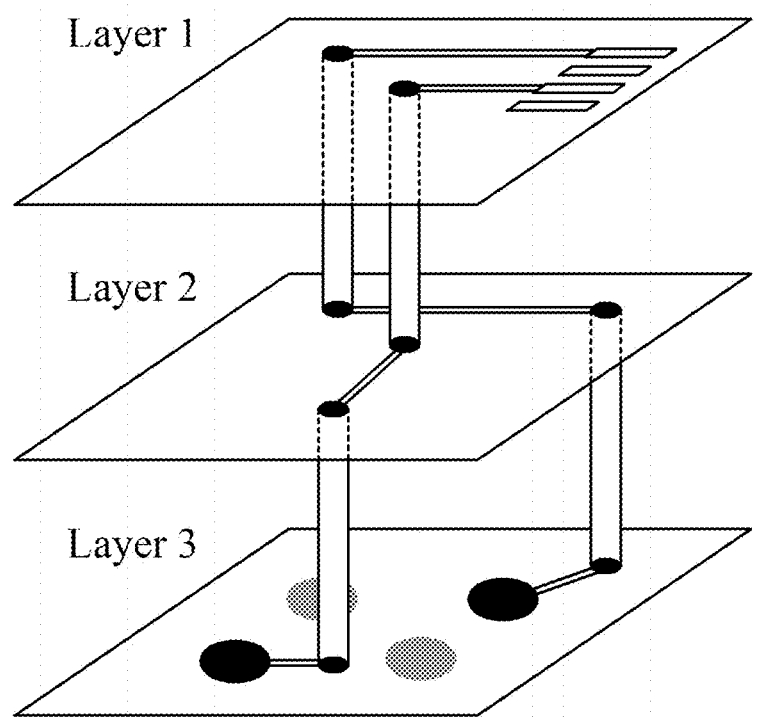

Referring to FIG. 3A, a semiconductor substrate may have a multilayer structure. As an example, each layer constituting a multilayer structure may be connected by vias, and one or more start points and one or more end points included in each layer may be distributed at different locations.

According to an example, the start point and the end point may be finger bonds, solder balls, or vias connecting adjacent layers of a semiconductor package substrate. As an example, the start point and the end point of the multilayer structure substrate may be a global start point and a global end point, and the start point and end point included in each layer may be a local start point and a local end point.

According to an example, the apparatus for path routing may connect the global start point and the global end point by individually connecting the local start point and the local end point included in each floor.

Figure 3B:
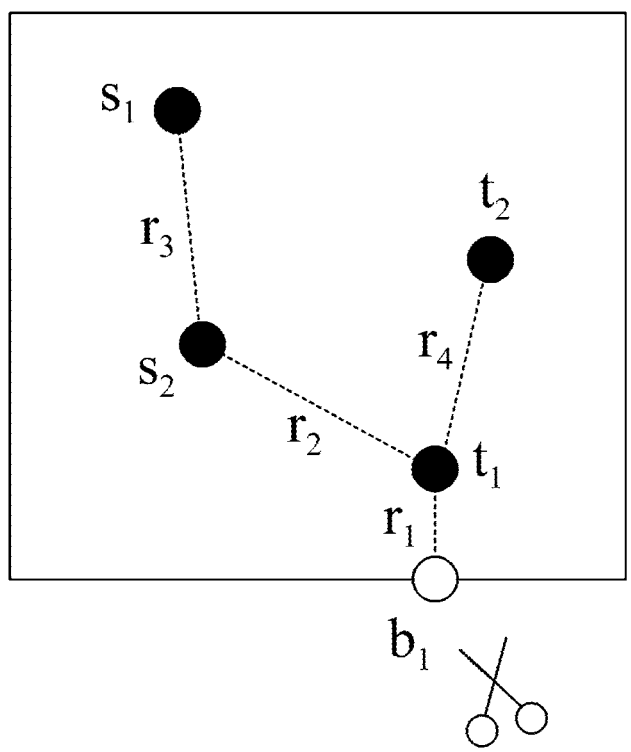

FIG. 3B illustrates one layer in a multilayer structure. Referring to FIG. 3B, one layer may include one or more start points $s_1$ and $s_2$ and end points $t_1$ and $t_2$.

According to an example, the circular frame may be obtained by using a geometric transformation of the path routing environment. According to an example, when transforming the path routing environment into a circular frame, connecting the start point and the end point on the substrate may be replaced by connecting the start point and the end point located at a boundary of the circular frame with a straight line that does not intersect. Accordingly, a connection relationship between the start point and the end point determined through the circular frame may be transformed into a connection relationship between the start point and the end point on the substrate.

According to an example, one substrate layer may include a pair of start point $s_i$ and end point $t_i$. As an example, in order to transform one substrate layer into a circular frame, the apparatus for path routing may connect all the start points and end points to a boundary of the substrate layer through an edge line $r_i$. In this case, the edge line $r_i$ forms a tree structure without a loop, and the tree structure can be connected to the boundary of the substrate layer through exactly one edge line at a point $b_1$ of the boundary of the substrate layer as illustrated in FIG. 3B.

Figure 3C:
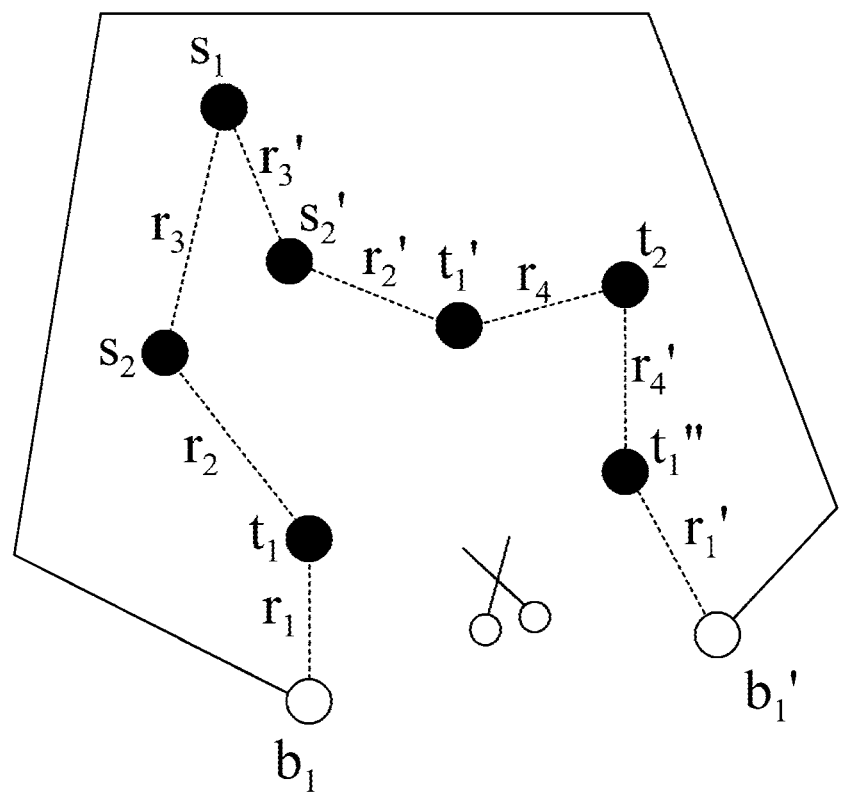

Referring to FIG. 3C, the substrate layer may be cut along the edge line $r_i$ from the boundary point $b_1$. As an example, when the start point and the end point are connected to two or more edge lines $r_i$, the start point and the end point may be divided into multiple copies. In this case, the divided start points and end points may constitute one start point set and end point set.

As an example, in the case of the start point $s_2$, since the start point $s_2$ is connected to two edge lines $r_2$ and $r_3$, the start point $s_2$ may be divided into $s_2$ and $s_2'$, and accordingly, the start point set for the start point $S_2$ may be $\{s_2, s_2'\}$. In this case, the edge line may be divided into a pair (ri, ri') during the cutting process.

As an example, when performing the cutting described above, the start point set may be $\{s_1\}$ for the start point S1 and $\{s_2, s_2'\}$ for the start point S2. As an example, the end point set may be $\{t_1, t_1', t_1''\}$ for the end point T1 and $\{t_2\}$ for the end point T2. As an example, the edge line pair set may be $\{(r_1, r_1'), (r_2, r_2'), (r_3, r_3'), (r_4, r_4')\}$.

According to an example, the edge line pair $(r_i, r_i')$ may correspond to one point as illustrated in FIG. 3D. For example, the edge line pair $(r_i, r_i')$ may correspond to an edge point pair $(r_i, r_i')$.

Referring to FIG. 3D, when both the boundary of the substrate layer and the edge lines are connected, one closed curve may be drawn, and in this case, all the start points, end points, and edge points may be located on the closed curve. Thereafter, when the closed curve is transformed into a circle, a circular frame may be generated as illustrated in FIG. 2.

Figure 4:
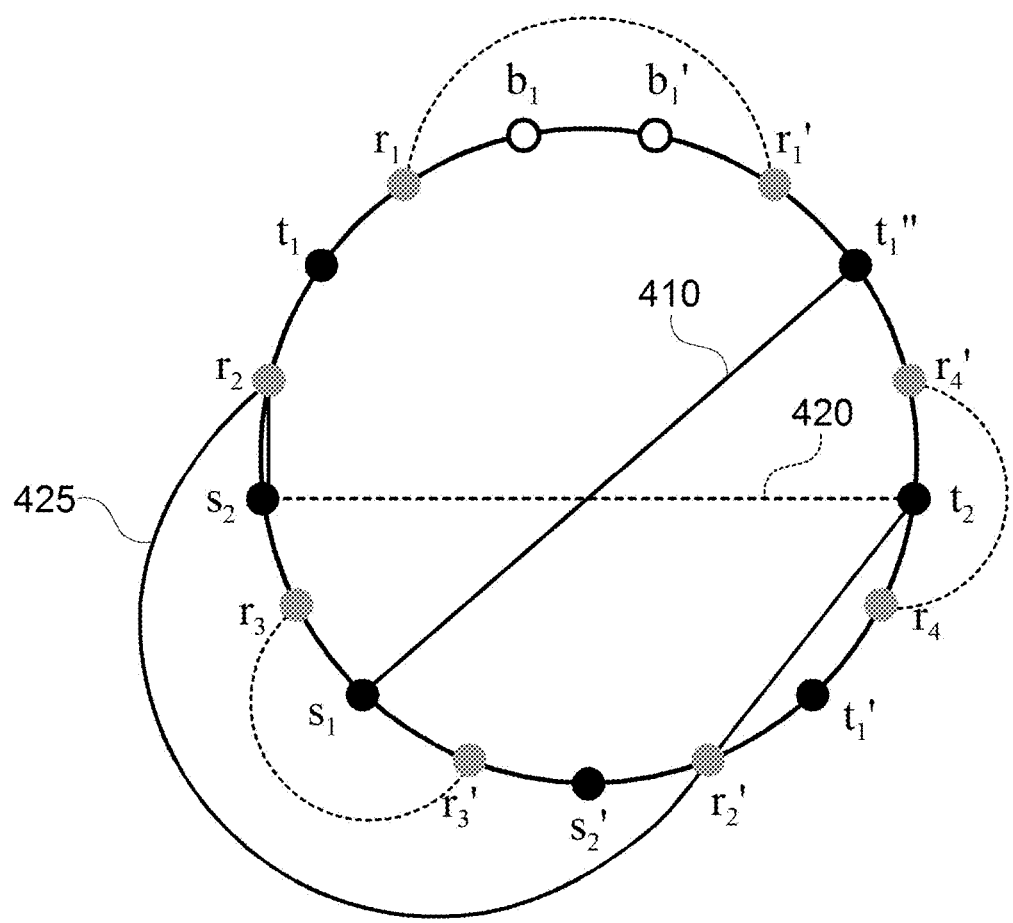
FIG. 4 is an exemplary diagram for describing a method for connecting a start point and an end point according to an embodiment.

FIG. 4 is an exemplary diagram for explaining a method for connecting a start point and an end point according to an embodiment.

As in the embodiment described with reference to FIGS. 3A to 3D, the start points and end points located on the substrate layer may correspond to the start points and end points of the circular frame. Accordingly, a line connecting one start point and one end point on the circular frame may be the same as that connecting the start point and the end point on the substrate layer.

According to an example, the apparatus for path routing may connect the start point and the end point on the circular frame in order to connect the start point and the end point on the substrate layer. As an example, the apparatus for path routing may generate one connection line 410 by connecting the start point $s_1$ and the end point $t_1''$.

Thereafter, the apparatus for path routing should connect the start point $s_2$ and the end point $t_2$. In this case, the apparatus for path routing should connect the start point $s_2$ and the end point $t_2$ so as not to intersect the connection line 410 connecting the start point $s_1$ and the end point $t_1''$. For example, when connecting the start point $s_2$ and the end point $t_2$ like the connection line 420, the two connection lines 410 and 420 intersect each other, which means that circuits intersect each other on the substrate layer. Accordingly, the apparatus for path routing should connect the start point and the end point so as not to intersect the connection line connecting the other start point and the other end point that are previously connected.

According to an example, the apparatus for path routing may connect the start point $s_2$ and the end point $t_2$ through a predetermined pair of boundary lines so as not to intersect the previously connected connection line 410.

As an example, the apparatus for path routing may generate a connection line 425 by connecting the start point S2 and the end point $t_2$ via a boundary line pair $(r_2, r_2')$ so that the connection lines do not intersect each other.

Referring to FIG. 1, according to an embodiment, the apparatus for path routing may generates a connectivity graph by connecting edge points included in one or more nodes corresponding to segments obtained by dividing the circular frame into one or more regions (120).

Figure 5A:
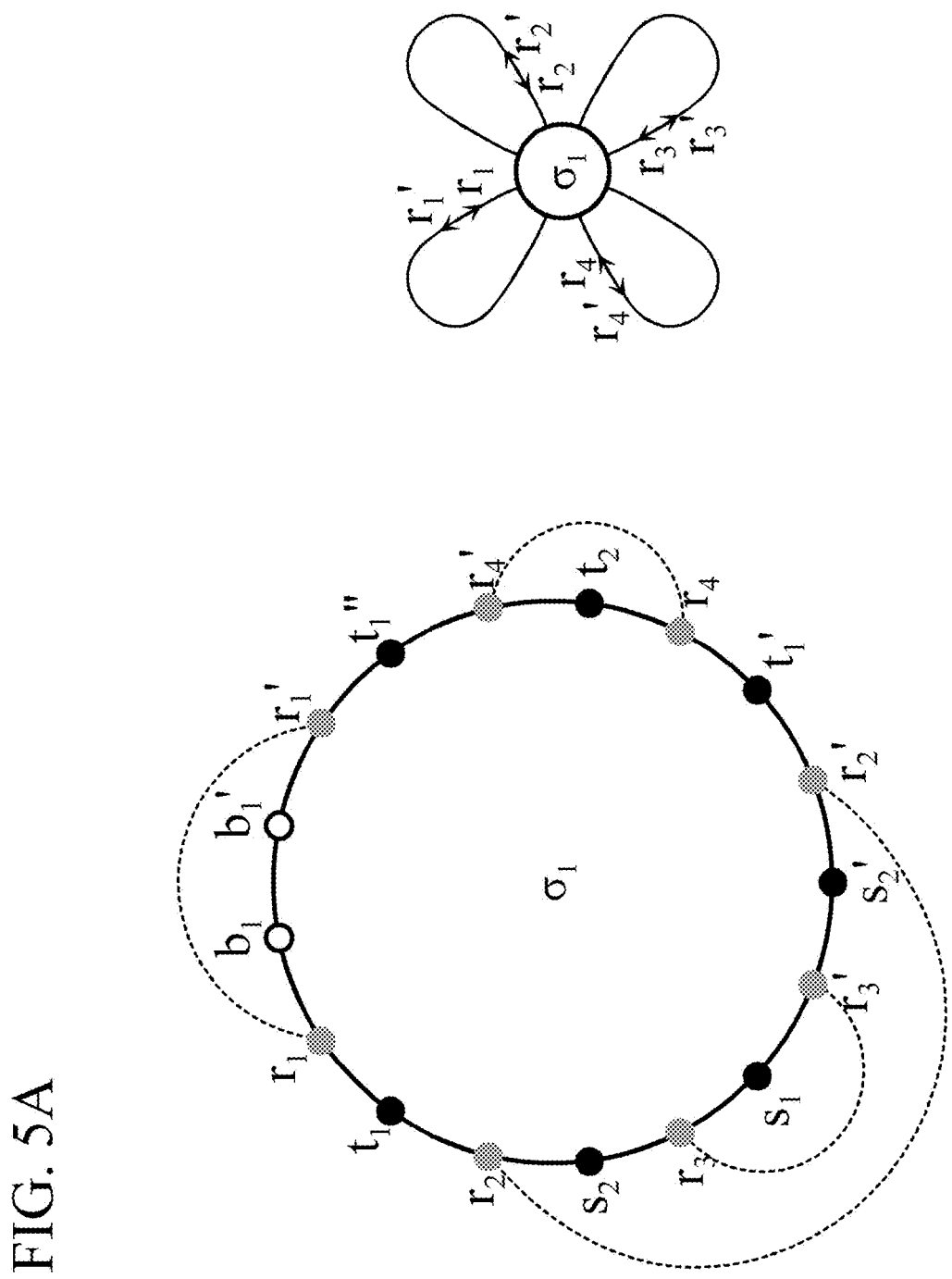
FIGS. 5A to 5C are exemplary diagrams for describing a connectivity graph according to an embodiment.
Figure 5B:
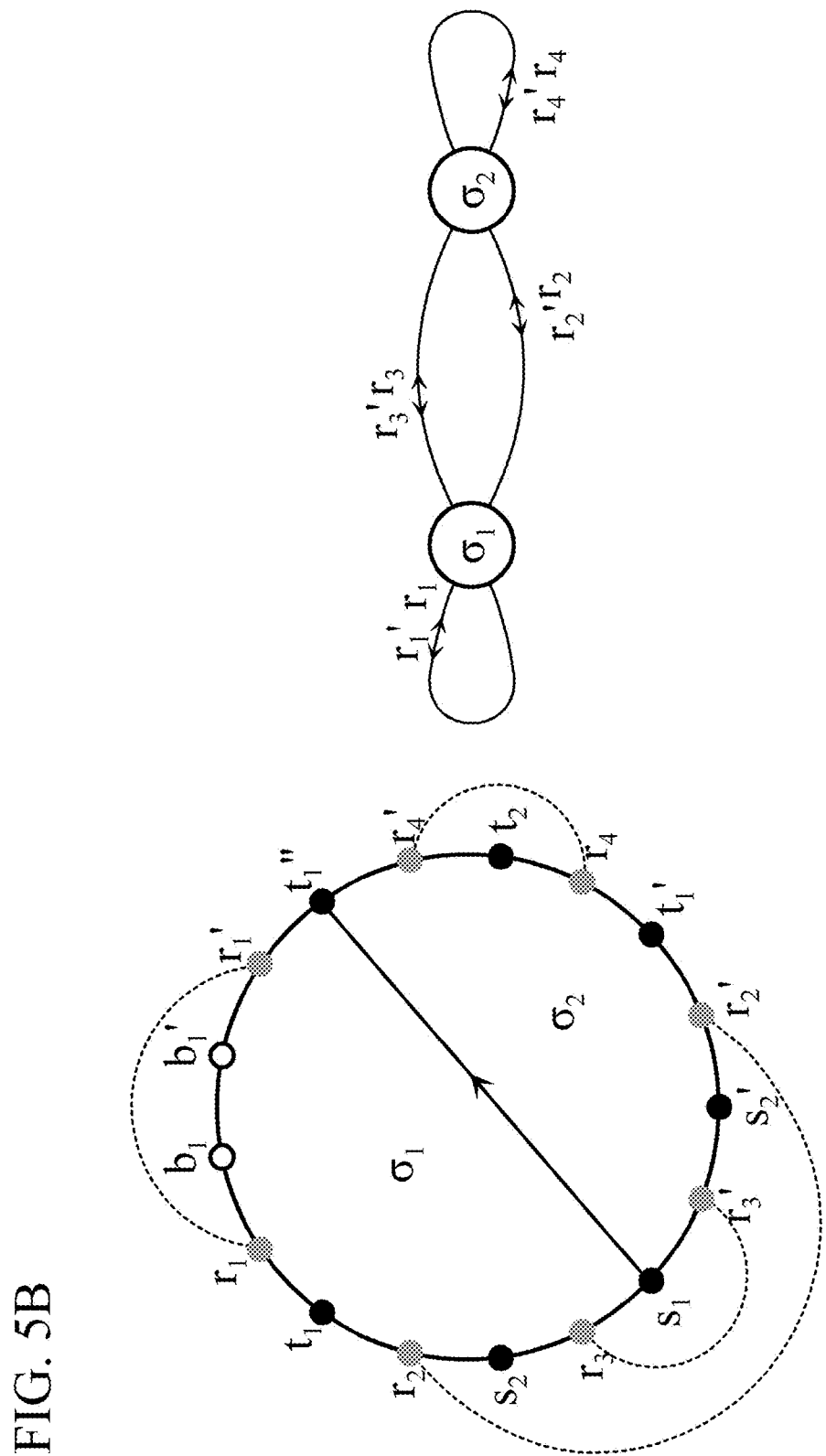
Figure 5C:
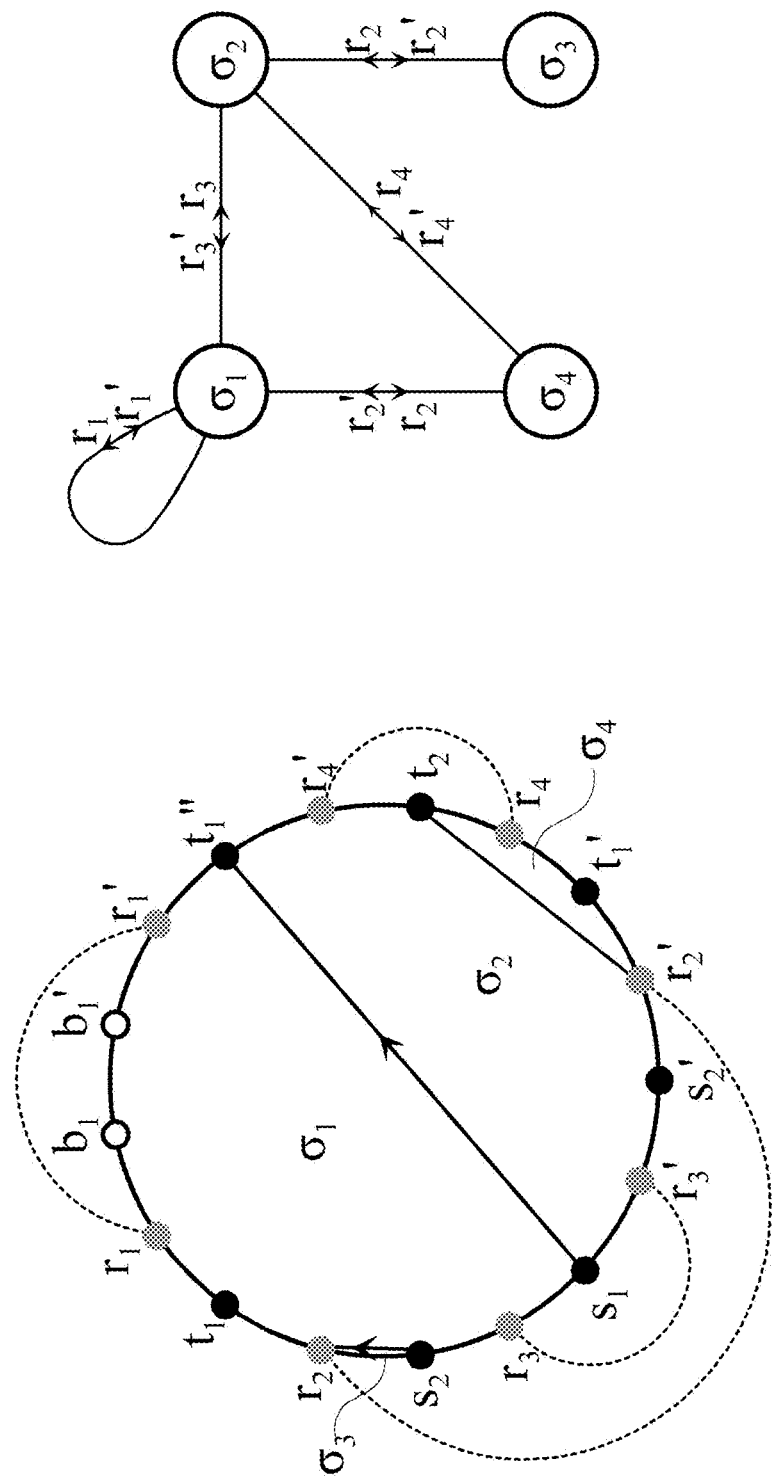

FIGS. 5A to 5C are exemplary diagrams for describing a connectivity graph according to an embodiment.

According to an embodiment, the apparatus for path routing may generate one or more nodes corresponding to one or more segments, and connect one or more nodes to each other using an edge point connection line connecting one or more edge points included in each of the one or more nodes to each other.

According to an example, the edge point connection line may be generated by connecting edge points included in the edge point pair.

Referring to FIG. 5A, a circular frame corresponding to one substrate layer may be composed of a single segment indicated by $\sigma_1$. In other words, the circular frame is not divided by a connection line for connecting the start point and the end point, and thus may be composed of one segment.

As an example, as illustrated in FIG. 5A, when the circular frame is composed of a single segment, a pair of edge points $(r_i, r_i')$ may be connected within the single segment $\sigma_1$ to generate an edge point connection line. In this way, a connectivity graph can be defined by connecting segments with pairs of edge points $(r_i, r_i')$.

According to an example, a segment on the circular frame may correspond to a node on the connectivity graph.

According to an example, the edge point connection line may have directionality. For example, an arrow on the edge point connection line may represent a tunnel to move from the edge point $r_i$ to the edge point $r_i'$ or from the edge point $r_i'$ to the edge point $r_i$.

According to an example, the apparatus for path routing may find a path from a node $\sigma_i$ to $\sigma_j$ on the connectivity graph based on the A* algorithm. As another example, the apparatus for path routing may find a path from a node $\sigma_i$ to $\sigma_j$ on the connectivity graph based on deep reinforcement learning. However, an algorithm for the apparatus for path routing to find a path is not limited thereto, and various types of graph search algorithms for a path search may be used.

Referring to FIG. 1, according to an embodiment, the apparatus for path routing may connect the first start point and the first end point based on a cost for connecting the first start point and the first end point calculated using the connectivity graph.

According to an example, the start point and the end point may be connected on a node. As an example, in the case of the start point $s_1$ and the end point $t_1''$, they may be located on the same node $\sigma_1$.

As an example, the start point $s_1$ and the end point $t_1''$ may be connected by using at least one of four edge point connection lines connected to the node $\sigma_1$. As another example, since the start point $s_1$ and the end point $t_1''$ are located on the same node $\sigma_1$, they may be connected within the node $\sigma_1$ without using an edge point connection line.

According to an embodiment, the cost may be calculated based on the number of edge point connection lines used to go from the node in which the first start point is included to the node in which the first end point is included.

According to an example, when the start point $s_1$ and the end point $t_1''$ are connected using at least one of four edge point connection lines connected to the node $\sigma_1$, the cost may be calculated based on the number of edge point connection lines used.

According to an example, when the start point $s_1$ and the end point $t_1''$ are connected within the node $\sigma_1$ without using the edge point connection line, the cost may be zero because the edge point connection line is not used.

According to an embodiment, when the node in which the start point is included and the node in which the end point is included are the same, the apparatus for path routing may connect the start point and the end point within the node without using the edge point connection line.

According to an example, the apparatus for path routing may connect the start point and the end point using a connection method that incurs the least cost. As an example, when the start point $s_1$ and the end point $t_1''$ are connected within the node $\sigma_1$ without using the edge point connection line, no cost is incurred. Therefore, the apparatus for path routing may connect the start point $s_1$ and the end point $t_1''$ within the node $\sigma_1$ without using the edge point connection line.

According to an embodiment, the apparatus for path routing may generate a segment by subdividing the circular frame based on the connection line connecting the start point and the end point.

Referring to FIG. 5B, when one start point $s_1$ and end point $t_1''$ are connected, a circular frame may be divided into two segments $\sigma_1$ and $\sigma_2$ by the connection line connecting the start point $s_1$ and the end point $t_1''$. Accordingly, the segments $\sigma_1$ and $\sigma_2$ may correspond to two nodes $\sigma_1$ and $\sigma_2$.

Referring to FIG. 5B, the segment $\sigma_1$ on the circular frame may include $\{s_1, r_3, s_2, r_2, t_1, r_1, b_1, b_1', r_1', t_1''\}$, and the segment $\sigma_2$ may include $\{s_1, r_3', s_2', r_2', t_1', r_4, t_2, r_4', t_1''\}$. Accordingly, the node $\sigma_1$ on the connectivity graph may include $\{s_1, r_3, s_2, r_2, t_1, r_1, b_1, b_1', r_1', t_1''\}$, and the node $\sigma_2$ may include $\{s_1, r_3', s_2', r_2', t_1', r_4, t_2, r_4', t_1\}$.

According to an example, a pair of edge points may be connected to each other to generate an edge point connection line. In the case of FIG. 5B, an edge point pair $\{r_1, r_1'\}$ is included in the node $\sigma_1$, an edge point pair $\{r_2, r_2'\}$ is in included in the node $\sigma_1$ and node $\sigma_2$, an edge point pair $\{r_3, r_3'\}$ is included in the node $\sigma_1$ and node $\sigma_2$, and an edge point pair $\{r_4, r_4'\}$ is included in node $\sigma_2$. Accordingly, the edge point pair $\{r_1, r_1'\}$ is connected on the node $\sigma_1$, and the edge point pair $\{r_4, r_4'\}$ is connected on the node $\sigma_2$. On the other hand, one edge point of the edge point pair $\{r_2, r_2'\}$ and one edge point of the edge point pair $\{r_3, r_3'\}$ are located at the node $\sigma_1$ and the node $\sigma_2$, respectively, and the edge point connection lines by the edge point pair $\{r_2, r_2'\}$ and the edge point pair $\{r_3, r_3'\}$ connect the node $\sigma_1$ and the node $\sigma_2$.

According to an example, the apparatus for path routing may select one start point and one end point included in a start point set for $S_2$ and an end point set for $T_2$ and connect the selected start point and the selected end point to each other by using the newly generated connectivity graph.

As an example, the apparatus for path routing may select and connect the start point $s_2$ and the end point $t_2$.

Referring to FIG. 5B, the node $\sigma_1$ includes $\{s_1, r_3, s_2, r_2, t_1, r_1, b_1, b_1', r_1', t_1''\}$ and the node $\sigma_2$ includes $\{s_1, r_3', s_2', r_2', t_1', r_4, t_2, r_4', t_1\}$, and thus the start point $s_2$ may be included in the node $\sigma_1$ and the end point $t_2$ may be included in the node $\sigma_2$.

Accordingly, the apparatus for path routing should use the edge point connection line connecting the node $\sigma_1$ and the node $\sigma_2$ in order to connect the start point $s_2$ and the end point $t_2$.

As an example, the node $\sigma_1$ and the node $\sigma_2$ are connected by the edge point connection line obtained by connecting the edge point pair $\{n, r_2'\}$ and the edge point connection line obtained by connecting the edge point pair $\{r_3, r_3'\}$. Accordingly, when two nodes are connected, any one of the edge point connection line obtained by connecting the edge point pair $\{n, r_2'\}$ and the edge point connection line obtained by connecting the edge point pair $\{r_3, r_3'\}$ may be used.

In this case, in each of the case of using the edge point connection line obtained by connecting the edge point pair $\{n, r_2'\}$ and the case of using the edge point connection line obtained by connecting the edge point pair $\{r_3, r_3'\}$, two nodes are connected using one edge point connection line, and thus the two cases have the same cost. Accordingly, the apparatus for path routing may connect the two nodes by selecting any one of the two edge point connection lines. For example, the apparatus for path routing may connect two nodes by selecting the edge point connection line obtained by connecting the edge point pair $\{r_2, r_2'\}$.

According to an example, when the apparatus for path routing selects the edge point connection line obtained by connecting the edge point pair $\{r_2, r_2'\}$ and connects the start point $s_2$ and the end point $t_2$, as illustrated in FIG. 5C, the start point $s_2$ is connected to the edge point $r_2'$ to generate a connection line, and the edge point $r_2'$ connected to the edge point $r_2$ is connected to the end point $t_2$ to generate a connection line. Accordingly, the circular frame is subdivided by two additional connection lines to generate new segments $\sigma_3$ and $\sigma_4$.

Referring to FIG. 5C, the segment $\sigma_1$ on the circular frame may include $\{s_1, r_3, s_2, r_2, t_1, r_1, b_1, b_1', r_1', t_1''\}$, and the segment $\sigma_2$ on the circular frame may include $\{s_1, r_3'', s_2', r_2', t_2, r_4', t_1''\}$. In addition, the segment $\sigma_3$ on the circular frame may include $\{s_2, r_2\}$, and the segment $\sigma_4$ may include $\{r_2', t_1', r_4, t_2\}$.

Accordingly, the node $\sigma_1$ on the connectivity graph may include $\{s_1, r_3, s_2, r_2, t_1, r_1, b_1, b_1', r_1', t_1''\}$, the node $\sigma_2$ may include $\{s_1, r_3', s_2', t_2, r_4', t_1'''\}$, the node $\sigma_3$ may include $\{s_2, r_2\}$, and the node $\sigma_4$ may include $\{r_2', t_1', r_4, t_2\}$.

According to an example, the edge points of pair may be connected to each other to generate an edge point connection line. In the case of FIG. 5C, the edge point pair $\{r_1, r_1'\}$ is included in the node $\sigma_1$, the edge point pair $\{r_2, r_2'\}$ is included in the node $\sigma_1$ and node $\sigma_4$ and also included in the node $\sigma_3$ and node $\sigma_2$, the edge point pair $\{r_3, r_3'\}$ is included in the node $\sigma_1$ and node $\sigma_2$, and the edge point pair $\{r_4, r_4'\}$ is included in the node $\sigma_2$ and node $\sigma_4$. Accordingly, the edge point pair $\{r_1, r_1'\}$ is connected on the node $\sigma_1$. On the other hand, the edge point pair $\{r_3, r_3'\}$ is located at the node $\sigma_1$ and node $\sigma_2$, and thus connects the node $\sigma_1$ and node $\sigma_2$. In addition, the edge point pair $\{r_4, r_4'\}$ is located at the node $\sigma_2$ and node $\sigma_4$, and thus connects the node $\sigma_2$ and node $\sigma_4$.

As an example, the edge point pair $\{r_2, r_2'\}$ may be included in the node $\sigma_3$ and node $\sigma_2$ and also included in the node $\sigma_1$ and node $\sigma_4$. Accordingly, the edge point pair $\{r_2, r_2'\}$ may connect the node $\sigma_1$ and node $\sigma_4$, and may also connect the node $\sigma_3$ and node $\sigma_2$. Accordingly, when the start point $s_2$ and $t_2$ are connected, a connectivity graph as illustrated in the right side of FIG. 5C may be generated.

According to an embodiment, the apparatus for path routing may include one or more processors and a memory storing one or more programs configured to be executed by the one or more processors.

According to an embodiment, the program may include an instruction for selecting a first start point and a first end point with which path routing is performed in a circular frame generated by connecting all points included in one or more start point sets included in a layer, one or more end point sets paired with the start point set, and one or more edge point pair sets to one closed curve.

According to an embodiment, the program may include an instruction for generating a connectivity graph by connecting edge points included in one or more nodes corresponding to segments obtained by dividing the circular frame into one or more regions.

According to an embodiment, the program may include an instruction for connecting the first start point and the first end point based on a cost for connecting the first start point and the first end point calculated using the connectivity graph.

Figure 6:
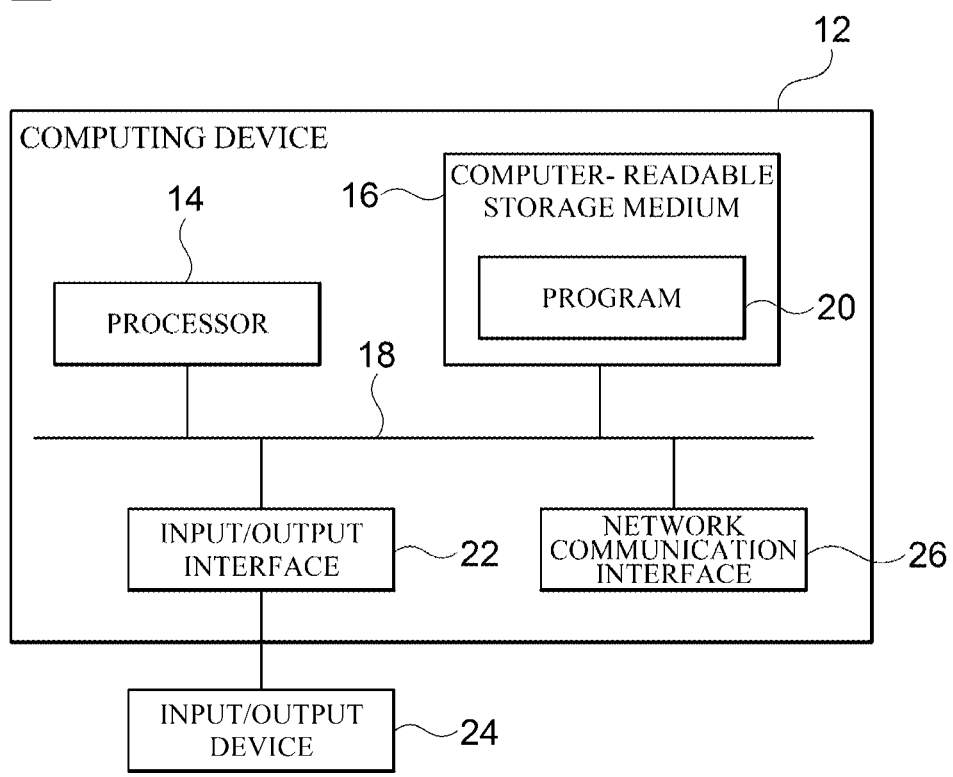
FIG. 6 is a block diagram for illustratively describing a computing environment including a computing device according to an embodiment.

FIG. 6 is a block diagram for illustratively describing a computing environment including a computing device according to an embodiment.

In the illustrated embodiment, each component may have different functions and capabilities in addition to those described below, and additional components may be included in addition to those described below.

The illustrated computing environment 10 includes a computing device 12. In one embodiment, the computing device 12 may be one or more components included in the apparatus 120 for path routing. The computing device 12 includes at least one processor 14, a computer-readable storage medium 16, and a communication bus 18. The processor 14 may cause the computing device 12 to operate according to the exemplary embodiment described above. As an example, the processor 14 may execute one or more programs stored on the computer-readable storage medium 16. The one or more programs may include one or more computer-executable instructions, which, when executed by the processor 14, may be configured to cause the computing device 12 to perform operations according to the exemplary embodiment.

The computer-readable storage medium 16 is configured to store the computer-executable instruction or program code, program data, and/or other suitable forms of information. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a voice or sound input device, input devices such as various types of sensor devices and/or photographing devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

Although the present invention has been described in detail through representative examples above, those skilled in the art to which the present invention pertains will understand that various modifications may be made thereto within the limit that do not depart from the scope of the present invention. Therefore, the scope of rights of the present invention should not be limited to the described embodiments, but should be defined not only by claims set forth below but also by equivalents of the claims.

What is claimed is:

1. A method, which is performed on a computing device comprising one or more processors and a memory storing one or more programs executed by the one or more processors, the method comprising:
   selecting a first start point and a first end point with which path routing is performed in a circular frame generated by connecting all points included in one or more start point sets included in a layer, one or more end point sets paired with the start point set, and one or more edge point pair sets to one closed curve;
   generating a connectivity graph by connecting edge points included in one or more nodes corresponding to one or more segments obtained by dividing the circular frame into one or more regions; and
   connecting the first start point and the first end point based on a cost for connecting the first start point and the first end point calculated using the connectivity graph.

2. The method of claim 1, wherein the selecting of the first start point and the first end point selects a first start point set from among the one or more start point sets and a first end point set paired with the first start point set from among the one or more end point sets, and selects the first start point and the first end point from the first start point set and the first end point set.

3. The method of claim 2, wherein the selecting of the first start point and the first end point selects the first start point set and the first end point set from one or more start point sets and one or more end point sets excluding other previously selected start point sets and other previously selected end point sets.

4. The method of claim 1, wherein the first start point and the first end point is connected so as not to intersect a connection line connecting other start points and other end points previously connected.

5. The method of claim 1, wherein the generating of the connectivity graph generates the one or more nodes corresponding to the one or more segments, and connects the one or more nodes to each other by using an edge point connection line that connects one or more edge points included in each of the one or more nodes to each other; and the edge point connection line is generated by connecting edge points included in edge point pairs.

6. The method of claim 5, wherein the cost is calculated based on the number of edge point connection lines used to go from a node in which the first start point is included to a node in which the first end point is included.

7. The method of claim 5, wherein when the node in which the first start point is included and the node in which the first end point is included are the same, the first start point and the first end point is connected within the node without use of the edge point connection line.

8. The method of claim 1, further comprising:

generating a segment by subdividing the circular frame based on a connection line connecting the first start point and the first end point.

9. A computing device comprising:

one or more processors; and a memory storing one or more programs executed by the one or more processors, wherein the one or more programs includes instructions for executing steps of:

selecting a first start point and a first end point with which path routing is performed in a circular frame generated by connecting all points included in one or more start point sets included in a layer, one or more end point sets paired with the start point set, and one or more edge point pair sets to one closed curve;

generating a connectivity graph by connecting edge points included in one or more nodes corresponding to one or more segments obtained by dividing the circular frame into one or more regions; and connecting the first start point and the first end point based on a cost for connecting the first start point and the first end point calculated using the connectivity graph.

10. The computing device of claim 9, wherein the selecting of the first start point and the first end point selects a first start point set from among the one or more start point sets and a first end point set paired with the first start point set from among the one or more end point sets, and selects the first start point and the first end point from the first start point set and the first end point set.

11. The computing device of claim 10, wherein the selecting of the first start point and the first end point selects the first start point set and the first end point set from one or more start point sets and one or more end point sets excluding other previously selected start point sets and other previously selected end point sets.

12. The computing device of claim 9, wherein the first start point and the first end point is connected so as not to intersect a connection line connecting other start points and other end points previously connected.

13. The computing device of claim 9, wherein the generating of the connectivity graph generates the one or more nodes corresponding to the one or more segments, and connects the one or more nodes to each other by using an edge point connection line that connects one or more edge points included in each of the one or more nodes to each other; and the edge point connection line is generated by connecting edge points included in edge point pairs.

14. The computing device of claim 13, wherein the cost is calculated based on the number of edge point connection lines used to go from a node in which the first start point is included to a node in which the first end point is included.

15. The computing device of claim 13, wherein when the node in which the first start point is included and the node in which the first end point is included are the same, the first start point and the first end point is connected within the node without use of the edge point connection line.

16. The computing device of claim 9, further comprising:

generating a segment by subdividing the circular frame based on the connection line connecting the first start point and the first end point.

\* \* \* \* \*